No. 642,927. Patented Feb. 6, 1900.
F. SCHNEIDER.
REVERSIBLE CLUTCH MECHANISM.
(Application filed Aug. 24, 1899.)

(No Model.)

WITNESSES:
Donn Twitchell
H. L. Reynolds

INVENTOR
F. Schneider
BY Murray
ATTORNEYS

UNITED STATES PATENT OFFICE.

FRANZ SCHNEIDER, OF LAWRENCE, MASSACHUSETTS.

REVERSIBLE CLUTCH MECHANISM.

SPECIFICATION forming part of Letters Patent No. 642,927, dated February 6, 1900.

Application filed August 24, 1899. Serial No. 728,319. (No model.)

*To all whom it may concern:*

Be it known that I, FRANZ SCHNEIDER, of Lawrence, in the county of Essex and State of Massachusetts, have invented a new and Improved Reversible Clutch Mechanism, of which the following is a full, clear, and exact description.

My invention relates to an improvement in reversible clutch mechanisms or devices for connecting a driving and a driven member, so that power may be communicated to turn the driven member in either direction or to entirely disconnect the driving and driven members at will.

Reference is to be had to the accompanying drawings, forming a part of this specification, in which similar characters of reference indicate corresponding parts in all the figures.

Figure 1:
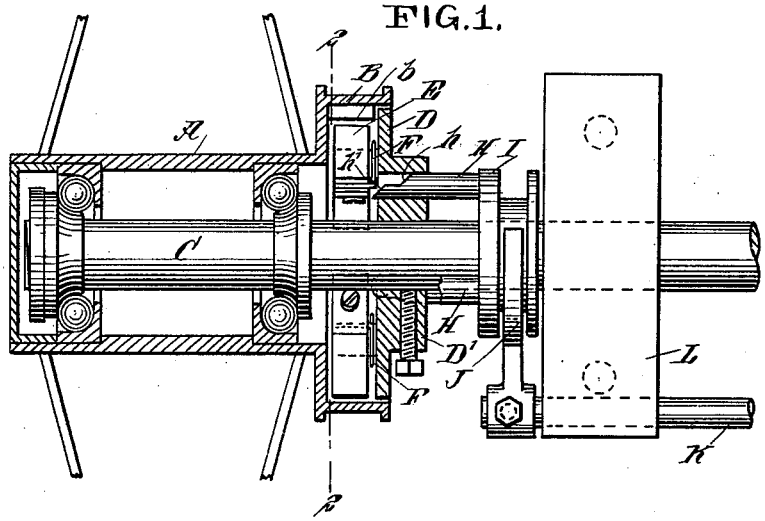
Figure 2:
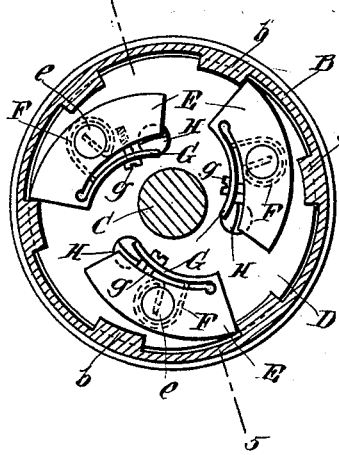
Figure 3:
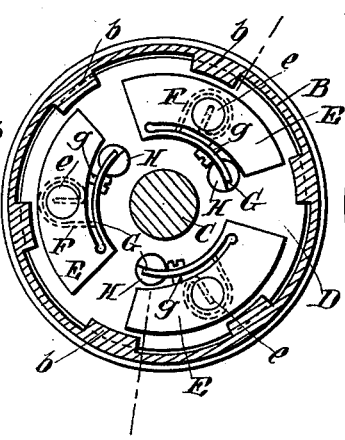
Figure 4:
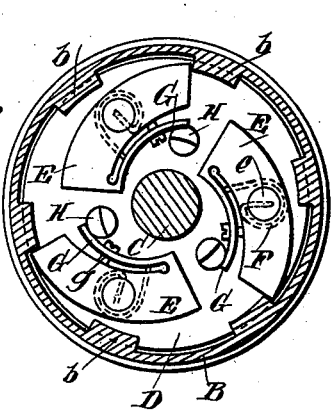
Figure 5:
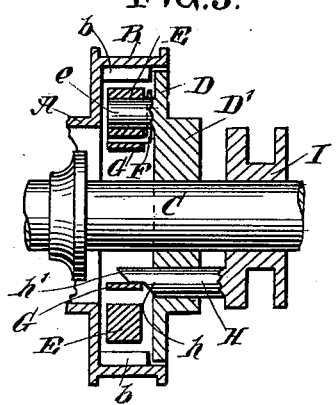

Figure 1 is a sectional side elevation of my device. Figs. 2, 3, and 4 are sections taken upon the line 2 2 of Fig. 1, showing the parts in different positions. Fig. 5 is a longitudinal section through the clutch mechanism, showing the parts in different positions from that shown in Fig. 1, the section being taken on the line 5 5 in Fig. 3.

The main object of my invention is to provide a device for connecting the axles and wheels of motor-vehicles so that the wheel may be enabled to turn faster than the axle, and yet enable the axle to engage the wheel to turn it positively when the speed of the axle is equal to that of the wheel.

The device is made so that it may connect the axle to the wheel to turn the wheel either forward or backward and may be set so as to be disengaged entirely from the wheel, so that the wheel may turn in either direction. While the device is herein described as applied to a motor-vehicle, it is evident that it may be applied to other uses equally as well.

Upon the axle C is mounted to freely turn the hub A of a wheel, and the hub has a cylinder or band B secured thereto and of slightly-larger diameter than the hub. This band or cylinder is provided with inwardly-projecting teeth or lugs $b$, which are adapted to be engaged by the pawl members of the driving mechanism.

Upon the shaft C is securely mounted a disk D, upon one face of which is pivoted a series of pawl members or dogs E, the pivot being located at substantially the middle of the length of said pawls. As herein shown, the cylinder B is provided with six lugs $b$, and the disk D is provided with three pawls E. To the pivots $e$ of the dogs are secured one end of springs F, which are also secured at their opposite ends to the dogs, so as to throw one end thereof outward into engagement with the lugs or teeth $b$. If unrestrained, these dogs would therefore have one end thereof constantly in engagement with the lugs $b$. If power be applied to turn the axle C in one direction, these dogs will engage the lugs or teeth and will turn the cylinder B, and with it the hub A, to which said cylinder is secured. If, however, the carriage should run faster than the axle is being turned, by reason of going down an incline or turning a corner, the wheel will be free to turn by the lugs $b$ riding over the inclined outer surface of the dogs and forcing the same inward. The springs F will, however, keep the same end of the dogs forced outward, so that as soon as the speed of the wheel drops to that of the axle the dogs will have operative engagement with the cylinder B.

The disk D is provided with a hub D', by which it is firmly secured to the axle and through which are made holes adapted to receive rods or bars H, said rods having their inner ends provided with inclines $h$ and $h'$, as clearly shown in Figs. 1 and 5.

Upon the inner edges of the dogs E are formed or secured suitable springs G, preferably flat or bar springs, said springs being secured by one end and having the other end free. These springs are adjusted in normal tension so that their free ends are removed at some distance from the corresponding ends of the dogs. To adjust the positions of the springs and their tension, adjusting set-screws or bolts $g$ are provided, which pass through the springs G and into the dogs E. The rods or bars H, by which the dogs are reversed, are so located relatively to the ends of the springs G that if they are pushed inward the outer or end incline $h'$ will engage the ends of the springs and force the corresponding end of the dog outward. The first incline $h'$ is sufficient in amount to force the end of the dog outward until the outer side of the dog is substantially concentric with the center of the axle, so that neither end of the dog will engage the lugs upon the cylinder B. In this position the wheels are free to turn in either direction. If it is desired to reverse the position of the dogs, so as to turn the wheels in the opposite direction, the bars H are pushed inward until the incline h engages the end of the spring G, which results in forcing the corresponding end of the dog farther outward, or until it will engage the lugs b. The clutch is then in position to communicate power to the wheel in the opposite direction.

The springs G are of sufficient strength to easily overcome the springs F. Three of the bars H are provided, one for each dog, the outer ends of these bars H being secured to a collar I, which is mounted to freely slide upon the axle C. This collar is provided with a peripheral groove, which is adapted to receive a yoke J, secured to one end of a rod K, mounted to slide within guides in a fixed head L of the frame. The rod K is moved lengthwise of the axle C by any suitable means.

With this device it is possible to readily disconnect the dogs and set them in the opposite position or to permit the wheel to run freely. This may be accomplished by a single lever.

Having thus fully described my invention, I claim as new and desire to secure by Letters Patent—

1. A ratchet or clutch device, comprising two relatively-rotatable members, one having projections or teeth thereon and the other having pawls pivoted thereon by their centers and adapted to engage either end with the teeth on the other member, springs tending to hold one end of said pawls engaged with said teeth, and independent means for positively engaging the pawl to overcome the action of said spring and to shift the opposite end of said pawl into engagement with said teeth, substantially as described.

2. A ratchet device, comprising two relatively-rotatable members, one having projections or teeth thereon and the other having pawls pivoted thereon by their centers and adapted to engage either end with the teeth on the other member, springs tending to hold one end of said pawls engaged with said teeth, and bars mounted to slide lengthwise the axis of said clutch members and having inclines thereon adapted to engage said pawls to reverse their position and to engage their opposite ends with the teeth, substantially as described.

3. A ratchet device, comprising a casing, and a concentric disk within the same, one being mounted on a driving member and the other upon a driven member, the casing having projections or teeth and the disk having pawls centrally pivoted thereon, and adapted to engage either end with the teeth on the casing, springs normally holding one end of said pawls in engagement with the teeth, and independent means for shifting said pawls so as to clear both ends from the teeth or to engage the opposite ends with the teeth, and a spring of superior strength to the other spring interposed between said shifting means and the pawl, substantially as described.

4. A ratchet device, comprising a casing and a concentric disk within the same, one being mounted on a driving member and the other upon a driven member, the casing having projections or teeth and the disk having segment-shaped pawl-bars centrally pivoted thereon and adapted to engage either end with the teeth on the casing, springs normally holding one end of said pawls in engagement with the teeth, bar-springs secured by one end to the inner sides of the pawl-bars, and shifting bars or rods mounted to slide parallel with the axis of the clutch members, said shifting-bars having inclines adapted to engage the inner surfaces of the bar-springs to move the pawls respectively into inoperative and into reversed locking positions, substantially as described.

5. A ratchet device, comprising a casing and a concentric disk within the same, one being mounted on a driving member and the other upon the driven member, the casing having projections or teeth and the disk having segment-shaped pawl-bars centrally pivoted thereon and adapted to engage either end with the teeth on the casing, and springs normally holding one end of said pawls in engagement with the teeth, bar-springs secured by one end to the inner sides of the pawl-bars, adjusting-screws adapted to regulate the position of the bar-springs relatively to the pawls, and shifting bars or rods mounted to slide parallel with the axis of the clutch members, said shifting-bars having inclines adapted to engage the inner surfaces of the bar-springs to move the pawls respectively into inoperative and into reversed locking position, substantially as described.

6. A ratchet device, comprising a casing and a concentric disk within the same, one being mounted on a driving member and the other upon a driven member, the disk and casing having the one, projections or teeth and the other segment-shaped pawl-bars centrally pivoted thereon and adapted to engage either end with the teeth, springs normally holding one end of said pawls in engagement with the teeth, bar-springs secured by one end to the inner sides of the pawl-bars, shifting bars or rods mounted to slide parallel with the axis of the clutch members, said shifting-bars having inclines adapted to engage the inner surfaces of the bar-springs to move the pawls respectively into inoperative and into reversed locking positions, a grooved collar slidably mounted axially of the clutch members and supporting the pawl-shifting bars, a yoke entering the grooves in said collar, and means for shifting said yoke and collar, substantially as described.

FRANZ SCHNEIDER.

Witnesses:
L. D. SHERMAN,
G. C. CANNON.